Dec. 21, 1965 J. HOLZER 3,225,315

DIFFERENTIAL CODE MODULATOR

Filed July 5, 1963 3 Sheets-Sheet 1

INVENTOR,
JOHANN HOLZER

BY Harry M. Saragovitz,
Edward J. Kelly,
Herbert Berl &
Julian C. Keppler
ATTORNEYS.

Dec. 21, 1965 J. HOLZER 3,225,315

DIFFERENTIAL CODE MODULATOR

Filed July 5, 1963 3 Sheets-Sheet 2

INVENTOR,
JOHANN HOLZER

BY Harry M. Saragovitz,
Edward J. Kelly,
Herbert Berl &
Julian C. Keppler
ATTORNEYS.

Dec. 21, 1965 J. HOLZER 3,225,315

DIFFERENTIAL CODE MODULATOR

Filed July 5, 1963 3 Sheets-Sheet 3

INVENTOR,
JOHANN HOLZER

BY Harry M. Saragovitz, Edward J. Kelly, Herbert Berl & Julian C. Keppler ATTORNEYS.

United States Patent Office 3,225,315

Patented Dec. 21, 1965

3,225,315
DIFFERENTIAL CODE MODULATOR

Johann Holzer, Elberon, N.J., assignor to the United States of America as represented by the Secretary of the Army Filed July 5, 1963, Ser. No. 293,216
8 Claims. (Cl. 332—11)
(Granted under Title 35, U.S. Code (1952), sec. 266)

The invention described herein may be manufactured and used by or for the Government for governmental purposes without the payment of any royalty thereon.

This invention relates to pulse transmission systems, and more particularly to an improved differential code modulator system.

It is well known that delta-modulation systems employing the one-digit binary unit code are less complex than conventional pulse-code modulation systems. Although the quality of the pulse-code modulation systems is better than that achieved by delta-modulation systems especially for voice signals, such systems have proved to be either too complex or expensive to allow their use at each subscriber station.

It is an object of the present invention to provide a simple and low cost differential code modulator system to produce output signals comparable in quality to that of pulse code modulation.

It is another object of the present invention to provide a differential code modulator system which requires relatively few components and is characterized by a relatively high signal to noise ratio.

In accordance with the present invention, there is provided a differential code modulator including a source of input signal voltage, a source of periodic pulses and a source of pulses which is a prescribed sub-multiple of the periodic pulses. Also included are means for sampling the input signal voltage by the sub-multiple pulses and means responsive to the sampled input signal for producing an attenuated replica of the input signal samples but delayed with respect thereto by the sub-multiple interval. Included further is a coding network and means in circuit with the input of the coding network and responsive to the sub-multiple pulses for simultaneously producing periodically at the sub-multiple rate two exponentially decaying waveforms 180° out-of-phase. Also included are means including a feedback circuit for producing a signal across the coding network which approximates the attenuated replica signal but is opposite in polarity thereto, the attenuated replica producing means being responsive to the approximated signal for producing an error signal at the output of the replica producing means. In addition, there is included means for sampling the error signal by the periodic pulse signals for producing pulses of constant amplitude when the sampled error signal exceeds a prescribed level. The feedback circuit comprises a two-polarity pulse generatnig means having its input responsive to the constant amplitude signals such that the duration of pulses of one polarity corresponds to the time the constant amplitude signals are present and the duration of pulses of the second polarity corresponds to the time that no constant amplitude pulses are present. The respective outputs of the two-polarity generating means is in circuit with the output of the exponentially decaying waveform producing means for gating one or the other of these waveforms to the input of the coding network to produce the aproximated signal across the coding network.

For a better understanding of the invention, together with other and further objects thereof, reference is had to the following description taken in connection with the accompanying drawing in which.

Figure 1:
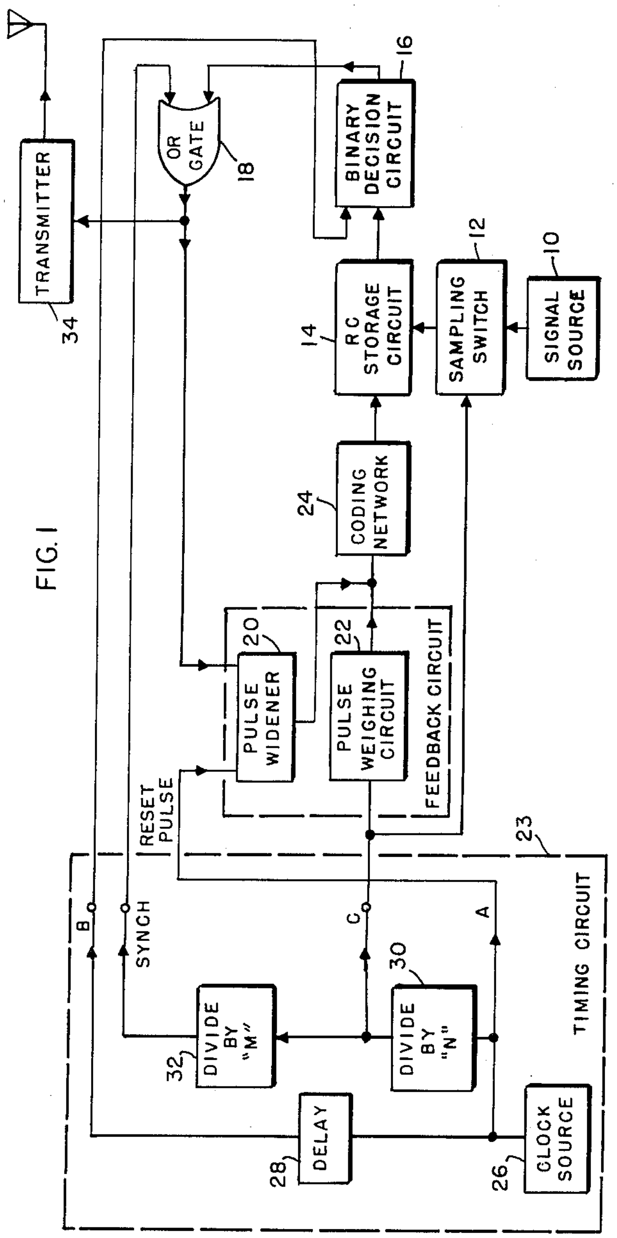
FIG. 1 is a block diagram of the differential code modulator in accordance with the present invention.

Referring now to FIG. 1 of the drawings, the input signal to be transmitted from source 10 is sampled periodically through sampling switch 12 and is stored in R-C storage circuit 14. The sampling switch 12 is such that at equidistant sampling instants, it is closed for a short period with the result that R-C storage circuit 14 is charged to a voltage to the then occurring instantaneous amplitude value of the signal to be transmitted. R-C storage circuit 14 may comprise a conventional parallel arranged resistor and capacitor combination, or other suitable network configuration, and is characterized by a prescribed impulse response function or time constant such that the capacitor of the R-C storage circuit 14 discharges slowly through the resistor for the period between sampling pulses. The output of R-C storage circuit 14 is a waveform which contains a delayed and attenuated replica of the sampled input waveform. At 16 there is provided a binary decision circuit which, at prescribed trigger intervals, either produces a pulse or no pulse, depending on the level of the signal provided at its input. If, when triggered, the input voltage to binary decision circuit 16 is less than a prescribed voltage level, an output pulse will be produced. If, however, the input voltage to binary decision circuit 16 is greater than the prescribed voltage level, no pulse output will be derived from decision circuit 16. The pulse outputs of decision circuit 16 are applied through OR gate circuit 18 to a pulse widener circuit 20, the output of which provides negative or positive voltage levels referenced to a zero axis, and selectively gates signals derived from a pulse weighing circuit 22 to a coding network 24. The input of pulse weighing circuit 22 comprises an R-C network responsive to pulses spaced at preselected time intervals corresponding to the signal sampling pulses. The output of pulse weighing circuit 22 comprises a phase-splitter to which is applied the exponentially decaying voltage derived across the input R-C network. It is the specific function of pulse weighing circuit 22 to produce a pair of oppositely phased exponentially decaying voltages. The polarity of the exponentially decaying voltage applied to coding network 24 is controlled by the polarity output of pulse widener circuit 20. The coding network 24 includes an R-C network characterized by the same impulse response function, or time constant, as that of R-C storage circuit 14 and converts the voltage function applied at the input thereof to a current function and includes an integrator R-C circuit for integrating the current function. As explained hereinbelow, the instant sampled input signal at R-C storage circuit 14 is algebraically added to the integrated voltage remaining at the output of the coding network 24 which is an indication of the level of the preceding sampled input signal. The difference or error signal is applied as the input to binary decision circuit 16. In effect, the pulse widener circuit 20 and pulse weighing circuit 22 comprise a feedback network to reduce the error or difference between the previous sampled signal reconstructed across the coding network 24 and the next following sampled signal developed across the R-C storage circuit 14.

The timing pulses for the transmitter is shown at 23. A master clock pulse source 26 provieds a continuous stream of timing pulses (A) which are applied as reset pulses to pulse widener circuit 20 and as trigger pulses through delay circuit 28 to binary decision circuit 16. Delay circuit 28 provides a very slight delay of the timing pulses (B) from master clock source 26 to allow resetting of pulse widener circuit 20 before triggering binary decision circuit 16. The timing pulses from source 26 are divided by a factor N in divider circuit 30 and the pulse output stream therefrom (C) is supplied as timing impulses to both pulse weighing circuit 22 and sampling switch 12. N may be any integer depending on the basic clock rate and consistent with the well known sampling theory. Although, for purposes of this application, N is chosen to be "3," it is to be understood that other suitable values of N may be used. For example, for voice signals it was found that $N=4$ provides the best chance for good quality and reasonably low transmission rate. To assure proper synchronization between the timing sources for the transmitting and receiving systems, a synchronization pulse is inserted as one input to OR gate 18. This synch pulse is supplied by means of a second divider circuit 32 to which is fed the output of divider circuit 30. The synch pulse may be selected to occur periodically at a timing instant preceding each *m*th sampling pulse from clock 26, *m* of course being an integer. While this may change each *m*th sample by a very small amount, it will not significantly change the quality of the transmitted signal. The output pulses derived from binary decision circuit 16 are uniformly shaped and of constant amplitude, and are supplied through OR gate 18 to a suitable transmitter 34. Also, every *m*th sampling pulse, i.e. the synch pulse, is supplied through OR gate 18 to the transmitter 34.

Figure 2:
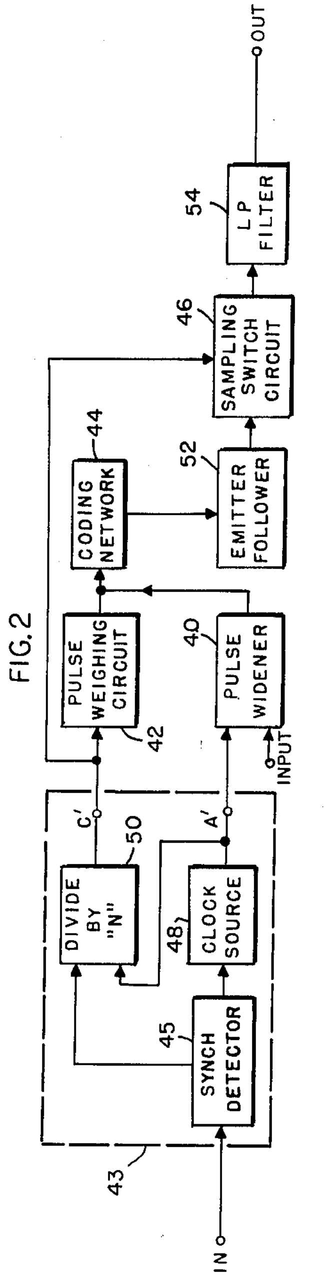
FIG. 2 is a block diagram of a receiver system to be used with the system shown in FIG. 1.

FIG. 2 is a block diagram of the receiver. Referring now to FIG. 2, the receiver includes a pulse widener circuit 40, a pulse weighing circuit 42, a coding network 44, and a sampling switch circuit 46 which are identical to similar transmitter components. The time constants of the respective R-C circuits in the receiver pulse weighing circuit 42, and coding network 44 are identical with respective time constants of the R-C circuits included in respective counterparts of the transmitter. The timing network of the receiver consists of a master clock pulse source 48, an N pulse divider 50 identical to that located at the transmitter and a synch detector 45. The clock pulses (A′) supplied by source 48 are synchronized by the output of a synch pulse detector 45 which is responsive to the transmitted synch pulses. Such slave synchronization circuits are well known in the art. An emitter follower circuit 52 is connected between the coding network 44 and sampling circuit 46 and is responsive to the voltage output of coding network 44 to produce a low impedance voltage source for the waveform appearing across coding network 44. This low impedance voltage is sampled through switch circuit 46 and passed through a low-pass filter 54 from which the output waveform repersenting a replica of the input signal at the transmitter is derived. Clock pulse source 48 supplies timing pulses to pulse widener circuit 40 to which is also applied the transmitted output pulses derived from the binary decision circuit 16 of the transmitter. The divider circuit 50 supplies the timing pulses (C′) to both pulse weighing circuit 42 and sampling switch circuit 46.

Figure 3:
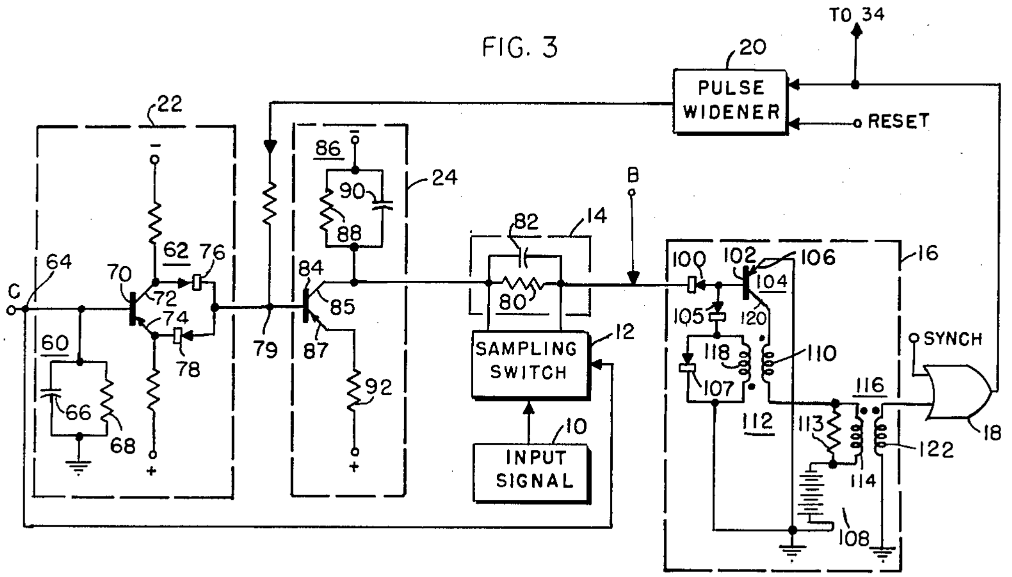
FIG. 3 is a schematic circuit of the differential code modulator.

FIG. 3 is a detailed schematic diagram of the modulator system shown in FIG. 1. Like numerals refer to like components. For the purpose of clarity the components of timing circuit 23 have been omitted. These components are conventional and no further description thereof is believed necessary. Referring now to FIG. 3, the pulse weighing circuit 22 comprises a parallel R-C circuit 60 and a phase splitter circuit 62. As shown, the input to pulse weighing circuit 22 is supplied by pulse divider 30 at terminal 64. These pulses periodically place a fixed charge on capacitor 66 of R-C circuit 60, and between applied pulses the capacitor 66 will discharge through resistor 68 and through the base of transistor 70. Thus between each third clock pulse a periodically occurring exponentially decaying waveform is developed across R-C circuit 60 and is supplied to the input of phase-splitter circuit 62 which includes transistor 70. As shown, the waveform across R-C circuit 60 is applied to the base of transistor 70 and two exponentially decaying voltages, 180° out-of-phase are developed at the collector 72 and emitter 74, respectively. The respecive voltage waveforms at collector 72 and emitter 74 are connected to the input of coding circuit 24 through respective oppositely poled diodes 76 and 78, with the cathode of diode 76 connected to the anode of diode 78 to provide a common output terminal as at 79. The gating of diodes 76 and 78 is provided by the output of pulse widener circuit 20 to control the relative polarity and amplitude of the voltage waveform applied from phase splitter output treminal 79 to the input of coding network 24. This will be better understood from the following description of the remainder of the transmitter circuit.

Referring again to FIG. 3, the same timing pulses applied to input terminal 64 are also applied as quantizing pulses to sampling switch 12 to which is also applied the input signal from source 10. Sampling switch 12 may be one of several gating circuits well known in the art. One such circuit is shown in FIGS. 14–20, page 444 of "Pulse and Digital Circuits" by Millman & Taub (1956). Thus, the input signal from source 10 is periodically sampled through switch 12 at a rate corresponding to every third clock pulse from clock source 26 of the transmitter. The sampled signals are applied to R-C storage circuit 14 which comprises a resistor 80 and a capacitor 82 connected in parallel between the output of coding circuit 24 and the input of binary decision circuit 16. The sampled signals passing through switch 12 are stored in capacitor 82 which, in turn, discharges slowly through resistor 80 until the next sampled signal pulse is applied to R-C storage circuit 14 at which time the cycle is repeated. Coding network 24 comprises a transistor 84 having its base connected to the common output terminal 79 of phase-splitter 62. The collector 85 of transistor 84 is serially connected to an R-C integrating circuit 86 composed of the parallel arrangement of resistor 88 and capacitor 90 and the emitter 87 of transistor 84 is positively biased through resistor 92. A negative bias is applied to collector 85 through resistor 88. The function of transistor 84 is to convert the voltage waveform applied thereto from phase-splitter 62 into a current function at its collector 85, and this current is then integrated by R-C circuit 86. Both the R-C integrating circuit 86 and the R-C storage circuit 14 are characterized by the same time constants and the time constant of phase-splitting R-C circuit 60 must be matched to that of both R-C circuits 14 and 86 such that a desirable approximation function can be achieved on coding network 24 as explained below. As shown, the output of coding network 24 is derived from collector 85 which is connected to one terminal of R-C storage circuit 14. Thus, effectively, the output of coding network 24 is algebraically added to the voltage waveform appearing across R-C storage circuit 14. The other terminal of R-C storage circuit 14 is connected to the input of decision circuit 16 which is time quantized by the pulses (B) derived from delay circuit 28 (FIG. 1) of the transmitter.

Decision circuit 16 includes an input diode 100 poled to pass negative pulses and having its anode connected to the base electrode 102 of transistor 104. Base electrode 102 is also connected to ground thru series connected diodes 105 and 107 which are poled to pass positive pulses. As shown, the cathode of diode 105 is connected to the anode of diode 107 whose cathode is grounded. Collector electrode 120 of transistor 104 is serially connected to the negative terminal of a power source 108 thru the primary winding 110 of transformer 112 and load resistor 113 across which is connected primary winding 114 of output transformer 116. The secondary winding 118 of transformer 112 is connected in parallel arrangement across diode 107. The emitter 106 of transistor 104 is connected directly to the positive terminal of power source 108 which is grounded. As shown, the transformer 112 is connected with the polarity of its windings opposite so that it will couple an inverted collector pulse back to the base thru diode 105 at an impedance level comparable to the base impedance.

The output of primary winding 114 of transformer 116 is applied thru a non-inverting secondary winding 122 and OR gate 18 as one input to pulse widener circuit 20 which may comprise a conventional flip-flop circuit. The output of master clock pulse source 26 is applied as a reset pulse to a second input of flip-flop circuit 20. The parameters of circuit 20 are chosen such that a pulse coming from decision circuit 16 will be widened to almost the whole time interval between two successive pulses derived therefrom, and the amplitude levels of the output of pulse widener circuit 20 will be alternated between two opposite polarity voltage levels. When triggered by pulses derived from decision circuit 16, the polarity output of pulse widener circuit 20 is at a positive level. When no pulses from decision circuit 16 are present, the flip-flop circuit 20 is reset to provide a negative polarity level output therefor. Since such flip-flop circuits are so well known in the art, it is believed that no detailed description thereof is necessary.

The output of pulse widener circuit 20 is applied to the common output terminal 79 of pulse weighing circuit 22 to control the gating of diodes 76 and 78. If the polarity at the output of pulse widener circuit 20 is positive, the exponentially decaying voltage at the emitter 74 of phase-splitter 62 will be passed to coding network current converter 84. If the polarity of the output of pulse widener circuit 20 is negative, then only the exponentially decaying voltage at the collector 72 of phase-splitter 62 will be gated to coding network current connector 84. Thus the pulse weighing circuit 22 will produce an exponentially decaying voltage waveform which may be changed from a positive to a negative polarity depending on the polarity of the output from pulse widener circuit 20. The integrated current across integrating R-C circuit 86 is algebraically added to the voltage waveform appearing on R-C storage circuit 14, the output of which in turn controls the operation of binary decision circuit 16. The pulses derived from decision circuit 16 and passed through OR gate 18 comprise the binary code which is transmitted by means of transmitter 34.

Figure 4:
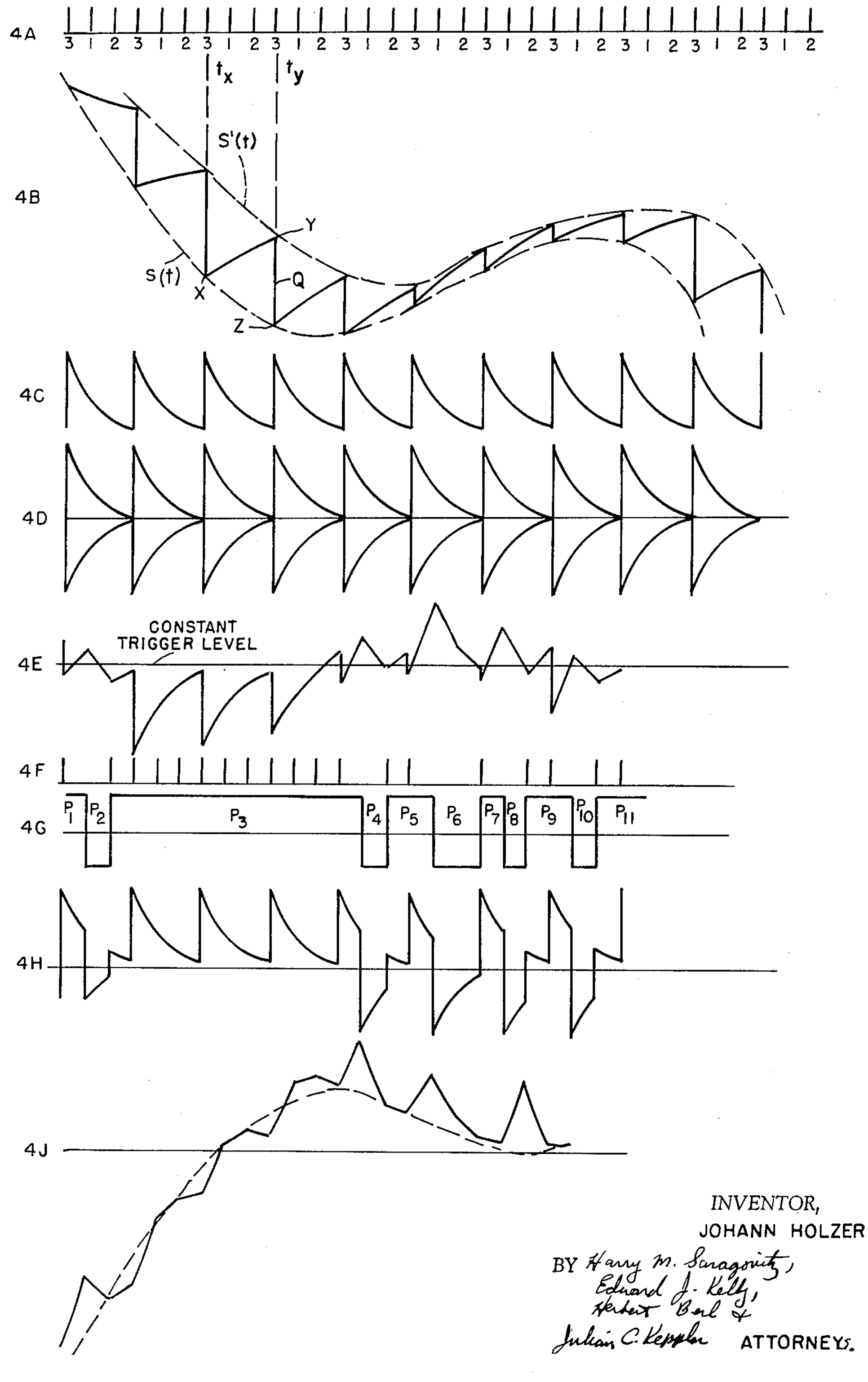
FIGS. 4 and 6 are explanatory signal curves.

In discussing the operation of the coder of FIGS. 1 and 3, reference is made to the curves shown in FIG. 4. The master clock pulses are shown in FIG. 4A. Assuming that $N=3$, the output from divider circuit 30 will comprise a stream of pulses having ⅓ the frequency of that supplied by master clock pulse source 26 so that every third pulse of the stream shown in FIG. 4A will correspond to the pulse derived from divider circuit 30. Thus, in FIG. 4A, the pulses are marked off in groups of three with every third pulse representing the sampling pulse applied to sampling switch 12 and the input pulse to input terminal 64 of pulse weighing circuit 22. The input signal from source 10 is shown as $S(t)$ in FIG. 4B. The periodic exponentially decaying waveform developed across pulse weighing R-C circuit 60 is shown in FIG. 4C and the outputs of phase-splitter 62 are shown in FIG. 4D. The upper curve of 4D is the waveform at collector 72 and the lower curve of 4D, of opposite polarity, is the waveform at emitter 74. FIG. 4E shows the input to binary decision circuit 16 with the constant trigger level represented by the horizontal line. FIG. 4F shows the coded pulse output of binary decision circuit 16. The corresponding output of pulse widener circuit 20 is shown in FIG. 4G. FIG. 4H shows the waveform applied to coding network 24 and FIG. 4J shows the voltage waveform developed across integrating R-C network 86 and derived from collector 85 of transistor 84. From curve 4B, it can be seen that the input signal $S(t)$ is sampled at every third clock pulse supplied by divider circuit 30. The level of input signal $S(t)$ at these sampling intervals is thus applied to R-C storage circuit 14 through sampling switch 12. As a result, the sampled signals will charge the capacitor 82 and this voltage will then discharge slowly through resistor 80 until the next sampling pulse is applied three clock pulses later. By such an arrangement, the waveform developed across R-C storage circuit 14 includes an attenuated and delayed replica of the input signal $S(t)$ and is shown at $S'(t)$ in FIG. 4B. As an example, the sampled input signal at X will appear at Y three clock pulses later than the sample time $t_x$, and is attenuated to amplitude Y at the sample time $t_y$, at which instant the amplitude of the input signal is at Z. Thus at time $t_y$, the difference between the preceding input sampled signal at X and that at Z is represented by the line Q. The solid line waveform between $S(t)$ and $S'(t)$ in FIG. 4B represents the voltage waveform developed across the capacitor 82 of R-C storage circuit 14. The difference between the levels of two successive sampled signals represented by Q, for example, is the error signal which is to be reduced to a minimum in the transmitting system.

As hereinabove described, the binary decision circuit 16 is set to produce an output pulse when the voltage applied thereto is below or more negative than the constant trigger level shown in FIG. 4E, and no pulse when the input thereto is above or more positive than this level. The operation of the decision circuit is fully described in Patent No. 2,990,520. Thus at indicated times (FIG. 4F) pulses will be applied from decision circuit 16 to provide an output from flip-flop circuit 20 and which is shown in FIG. 4G. The reset pulse applied to pulse widener circuit 20 restores the output thereof to its normal quiescent negative level, while the pulses derived from decision circuit 16 will produce outputs having a positive level and of a duration corresponding substantially to the time that successive decision pulses are present. The output controls the voltage fed back to coding network 24 in the following manner. The portion of the exponentially decaying waveforms shown in FIG. 4D derived from the phase splitter 62 and applied to coding network 24 is determined by the polarity of the output of pulse widener circuit 20. Thus for high or positive level outputs, $P_1$, $P_3$, $P_5$, and $P_7$, $P_9$ and $P_{11}$, etc., of pulse widener circuit 20, diode gate 78 becomes conductive and causes the input to coding network 24 to follow the positive portion of the exponentially decaying voltage waveform derived from emitter 74. For low or negative level pulses $P_2$, $P_4$, $P_6$, $P_8$, and $P_{10}$, etc., the diode 76 becomes conductive and causes the input to coding network 24 to follow the negative portion of the exponentially decaying voltage derived from collector 72 of transistor 70. The resulting waveform input to coding network 24 is shown in FIG. 4H. The time constant of R-C circuit 60 of pulse weighing circuit 22 is such that within each group of three clock pulses, the average magnitude of the amplitude of the exponentially decaying waveform integrated on coding network 24 between two successive pulses is changed by a factor of 2. Thus, the amplitude of the positive or negative pulses derived from pulse widener 20 may be said to be weighed by the amplitude of the exponentially decaying waveform applied to the input by coding network 24. The integrated waveform on R-C circuit 86 of coding network 24 is shown in FIG. 4J. At every third clock pulse, the output of coding network 24 is substantially equal to the voltage across the sampling circuit. The following sampled input signal is thereby subtracted from the previous sample stored in coding network 24. Each integration cycle has a duration of three clock pulses and the resulting integrated waveform is opposite in phase to that derived across R-C storage circuit 14. It can be seen from FIG. 4E that for every third clock pulse, the error voltage input to decision circuit 16 is a minimum and this error voltage at the input to decision circuit 16 will fluctuate around the constant amplitude trigger level. The pulses emitted from decision circuit 16 are transmitted to the receiver through transmitter 34.

Figure 5:
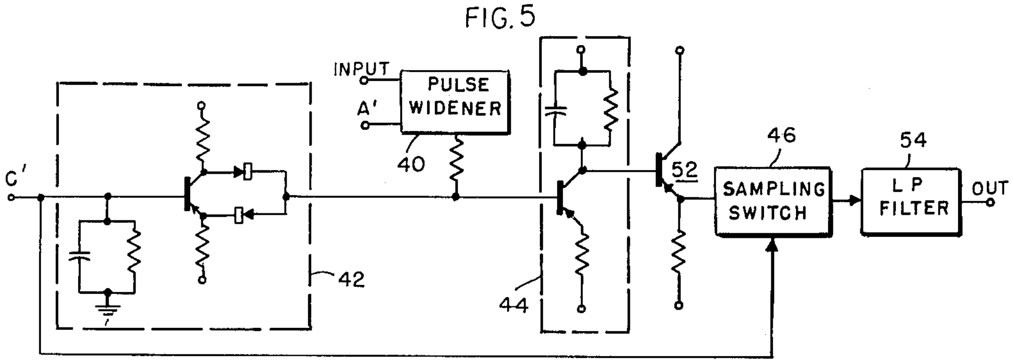
FIG. 5 illustrates a schematic diagram of the receiver system.
Figure 6:
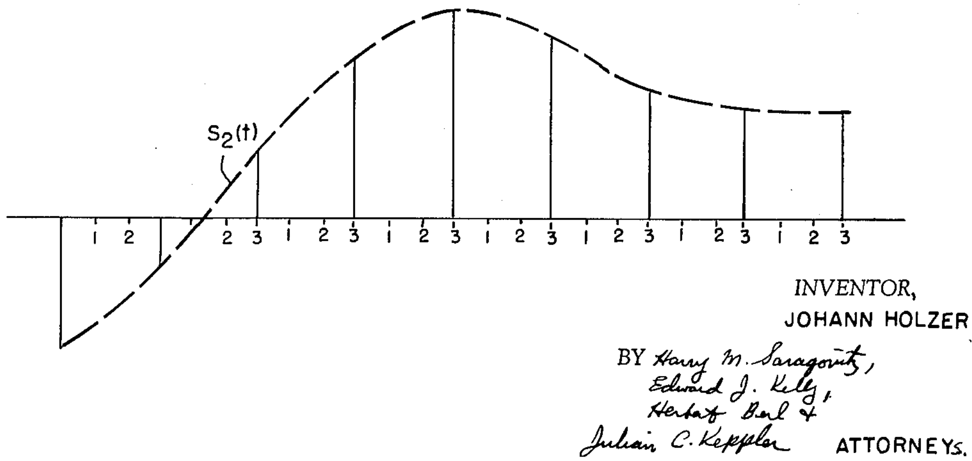

FIG. 5 is a schematic diagram of the receiver. Referring now to FIG. 5, the pulse weighing circuit 42, coding network 44, pulse widener 40, and sampling circuit 46 are identical in circuitry to their respective counterparts in the transmitter hereinabove described. The transmitted binary decision circuit pulses are applied as one input to pulse widener 40 and, as a result, the waveform output from pulse widener circuit 40 is identical to that derived from transmitter pulse widener 20 which is shown in FIG. 4G. The respective output waveform of pulse weighing circuit 42 and coding network 44 will be identical to that shown in FIGS. 4H and 4J. The output of coding network 44 is applied to sampling switch 46 through emitter follower 52 and is sampled every three clock pulses which are synchronized in time with the sampling pulse derived from divider circuit 30 at the transmitter. The sampled pulses are passed to low-pass filter 54. The approximate output of low-pass filter 54 is shown as $S_2(t)$ in FIG. 6. This output may be inverted by any suitable means to provide an output function which is a very close approximation to $S'(t)$, which in turn is an exact but delayed and attenuated replica of the input function $S(t)$ of the transmitter.

While there has been described what is at present considered to be the preferred embodiment of this invention, it will be obvious to those skilled in the art that various changes and modifications may be made therein without departing from the invention. For example, while the embodiment of the present invention uses simple R-C combinations in the pulse weighing circuit, the coding network, and in the sampling circuit, it is to be understood that other network configurations and weighing functions may be readily utilized to match particular features of the modulating signals such as voice facsimile, slow video, etc. It is therefore aimed in the appended claims to cover all such changes and modifications as fall within the true spirit and scope of the invention.

What is claimed is:

1. A differential code modulator comprising a source of input signal voltage, a source of periodic pulses, means for generating pulses periodically at a prescribed sub-multiple of said periodic pulses, means for sampling said input signal voltage by said sub-multiple pulses, means responsive to said sampled signal for producing an attenuated replia of said input signal delayed with respect thereto by said sub-multiple interval, means including a coding network for producing a signal approximating said attenuated replica but opposite in polarity thereto, said attenuated replica producing means being responsive to said approximated signal whereby there is produced an error signal at the output of said attenuated replica producing means, means for sampling said error signal at said periodic pulse rate, means responsive to said sampled error signal for producing pulses of constant amplitudes when said sampled error signal exceeds a prescribed level, said last mentioned means having its output in circuit with the opposite polarity signal approximating means.

2. The system in accordance with claim 1 wherein said opposite polarity signal approximating means comprises means in circuit with the input of said coding network and responsive to said sub-multiple pulses for simultaneously producing two exponentially decaying waveforms 180° out-of-phase, a two-polarity pulse generating means having its input responsive to said constant amplitude signals such that the duration of pulses of one polarity corresponds to the time said constant amplitude signals are present and the duration of the pulses of the second polarity corresponds to the time that no constant amplitude signals are present, said two-polarity generating means having its respective polarity outputs in circuit with the output of said exponentially decaying waveform producing means for gating one or the other of said exponentially decaying waveforms to the input of said coding network.

3. The system in accordance with claim 2 wherein the output of said coding network is algebracially added to the voltage developed across said attenuated replica producing means to produce said error signal.

4. The modulator in accordance with claim 2 wherein said coding network comprises a transistor having a base, collector and emitter, the gated exponentially decaying waveform being applied to said base, and an R–C integrating circuit in series connection with said collector.

5. A differential code modulator comprising a source of input signal voltage, a source of periodic pulses, means for generating pulses periodically at a prescribed sub-multiple of said periodic pulses, means for sampling said input signal voltage by said sub-multiple pulses, means responsive to said sampled signal for producing an attenuated replica of said input signal but delayed with respect thereto by said sub-multiple interval, a coding network, means in circuit with the input of said coding network and responsive to said sub-multiple pulses for simultaneously producing periodically at said sub-multiple rate two exponentially decaying waveforms 180° out-of-phase, means including a feedback circuit for producing a signal across said coding network approximating said attenuated replica signal but opposite in polarity thereto, said attenuated replica producing means being responsive to said approximated signal for producing an error signal at the output of said replica producing means, means for sampling said error signal at said periodic pulse rate, means responsive to said sampled error signal for producing pulses of constant amplitude when said sampled error signal exceeds a prescribed level, said feedback circuit comprising a two-polarity pulse generating means having its input responsive to said constant amplitude signals such that the duration of pulses of one polarity corresponds to the time said constant amplitude signals are present and the duration of pulses of the second polarity corresponds to the time that no constant amplitude pulses are present, said two-polarity generating means having its respective outputs in circuit with the output of said exponentially decaying waveform producing means for gating one or the other of said waveforms to the input of said coding network to produce the approximated signal across said coding network.

6. A differential code modulator comprising a source of input signal voltage, a source of periodic pulses, means for generating pulses periodically at a prescribed multiple of said periodic pulses, means for quantizing said input signal voltage by said sub-multiple pulses, an R-C storage circuit responsive to said quantized signal for producing an attenuated replica of said input signal but delayed with respect thereto by said sub-multiple interval, a coding network having an input and output, a decision circuit responsive to the output of said R-C storage circuit for sampling the output of the R–C storage circuit at said periodic pulse intervals such that constant amplitude pulses are developed at the output of said decision circuit when the sampled signals exceed a prescribed amplitude level, means in circuit with the input of said coding network and responsive to said sub-multiple pulses for simultaneously producing two exponentially decaying waveforms 180° out-of-phase, two-polarity pulse generating means responsive to the output of said decision circuit such that the duration of one polarity pulse corresponds to the time pulses from said decision circuit are present and the duration of the second polarity pulse corresponds to the time no pulses from said decision circuit are present, said two-polarity pulse generating means having its respective outputs in circuit with the output of said exponentially decaying waveform producing means for gating one or the other of said exponentially decaying waveforms to the input of said coding network whereby there is produced at the output of said coding network a signal approximating said attenuated replica signal but opposite in polarity thereto, said R-C storage circuit being responsive to said approximated signal for producing an error signal, the error signal between said approximated signal and said attenuated replica signal being a minimum at periodic intervals at said sub-multiple pulse rate.

7. The modulator in accordance with claim 5 wherein said coding network and said storage circuit each comprise parallel arranged R-C circuits characterized by the same time constants.

8. A differential code modulator comprising a source of input signal voltage, a source of periodic pulses, means for generating pulses periodically at a prescribed sub-multiple of said periodic pulses, means for quantizing said input signal by said sub-multiple pulses, a first parallel arranged R-C circuit resposive to said quantized signals for producing a signal waveform which is an attenuated replica of said input signal and delayed with respect thereto by said sub-multiple interval, a coding network comprising a voltage to current converter having a second parallel arranged R-C circuit in the output thereof, the time constants of said first and second R-C circuits being identical, means in circuit with the input of said coding network and responsive to said sub-multiple pulses for simultaneously periodically producing at said sub-multiple rate two exponentially decaying waveforms 180° out-of-phase, means including a feedback circuit for producing a signal across said second R-C circuit approximating said attenuated replica signal but opposite in polarity thereto, said first R-C circuit being responsive to said approximated signal for producing error signals across said first R-C signal at periodic intervals, the error signal being a minimum at periodic intervals of said sub-multiple pulse rate, means for sampling said error signal at said periodic pulse rate, means responsive to said sampled error signal for producing pulses of constant amplitude when said sampled error signal exceeds a prescribed level, said feedback circuit comprising a two-polarity pulse generating means having its input responsive to said constant amplitude signals such that the duration of pulses of one polarity corresponds to the time said constant amplitude signals are present and the duration of pulses of the second polarity corresponds to the time that no constant amplitude pulses are present, said two-polarity pulse generating means having its respective outputs in circuit with the output of said exponentially decaying waveform means for gating one or the other of said waveforms to the input of said coding network converter to produce the approximated signal across said R-C coding circuit.

No references cited.

HERMAN KARL SAALBACH, *Primary Examiner.*

P. L. GENSLER, *Assistant Examiner.*